United States Patent [19]
Staller et al.

[11] Patent Number: 5,567,932
[45] Date of Patent: Oct. 22, 1996

[54] GEOMEMBRANE BARRIERS USING INTEGRAL FIBER OPTICS TO MONITOR BARRIER INTEGRITY

[75] Inventors: George E. Staller; Robert P. Wemple, both of Albuquerque, N.M.

[73] Assignee: Sandia Corporation, Albuquerque, N.M.

[21] Appl. No.: 509,850

[22] Filed: Aug. 1, 1995

[51] Int. Cl.⁶ .................................. G02B 6/00; H01J 5/16
[52] U.S. Cl. ............................ 250/227.14; 250/227.15; 385/12
[58] Field of Search ................. 250/227.14, 227.11, 250/227.15, 227.17, 227.18, 227.19, 227.27; 385/12, 13

[56] References Cited

U.S. PATENT DOCUMENTS

| | | | |
|---|---|---|---|
| 4,603,252 | 7/1986 | Malek et al. | 250/227.14 |
| 4,609,816 | 9/1986 | Severin | 250/227.14 |
| 4,689,484 | 8/1987 | McMahon | 250/227.14 |
| 4,740,757 | 4/1988 | Converse et al. | 324/559 |
| 4,882,499 | 11/1989 | Luukkala et al. | 250/577 |
| 4,936,649 | 6/1990 | Lymer et al. | 250/227.14 |
| 4,947,470 | 8/1990 | Darilek | 324/557 |
| 5,072,617 | 12/1991 | Weiss | 73/299 |
| 5,132,529 | 7/1992 | Weiss | 250/227 |
| 5,138,153 | 8/1992 | Gergely et al. | 250/227.21 |
| 5,291,013 | 3/1994 | Nafarrate et al. | 250/227.14 |
| 5,299,271 | 3/1994 | Hildebrand | 250/227.14 |
| 5,399,854 | 3/1995 | Dunphy et al. | 250/227.14 |

*Primary Examiner*—Edward P. Westin
*Assistant Examiner*—John R. Lee
*Attorney, Agent, or Firm*—George H. Libman

[57] ABSTRACT

This invention provides a geomembrane or geotextile with embedded optical sensors that are used to monitor the status of containment site barriers. Fiber optic strands are used to form the sensors that can detect and monitor conditions at the sites such as breaches, slope creep, subsidence, leachate levels, fires, and types of materials present or leaking from the site. The strands are integral to the membrane or textile materials. The geosythetic membrane is deployed at the site in a fashion similar to carpet laying. Edges of the membrane or textile are joined to form a liner and the ends of the membrane or textile become the connection zones for obtaining signals from the sensors. A connection interface with a control system to generate Optical Time Delay Response or other light signals for transmission to the optic fiber strands or sensors and also to receive reflected signals from the sensors is included in the system. Software to interpret the sensor signals can be used in the geosythetic monitoring system.

20 Claims, 4 Drawing Sheets

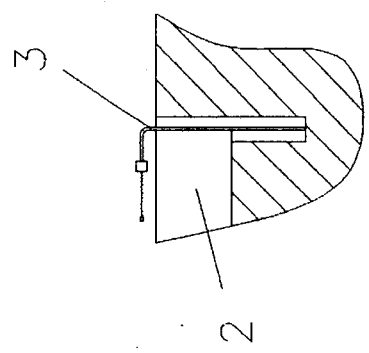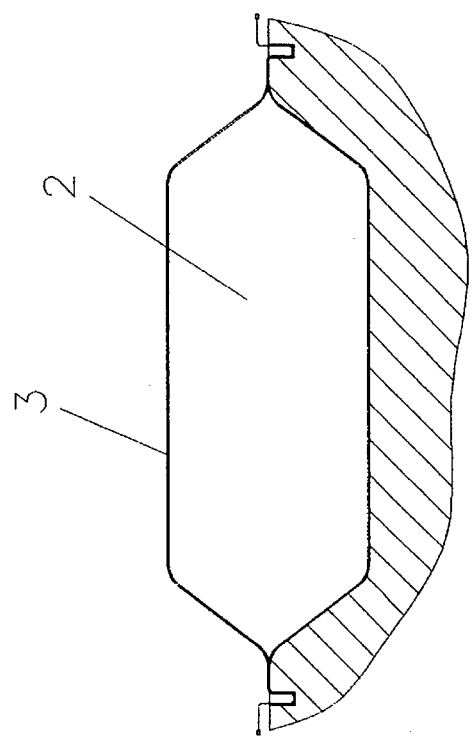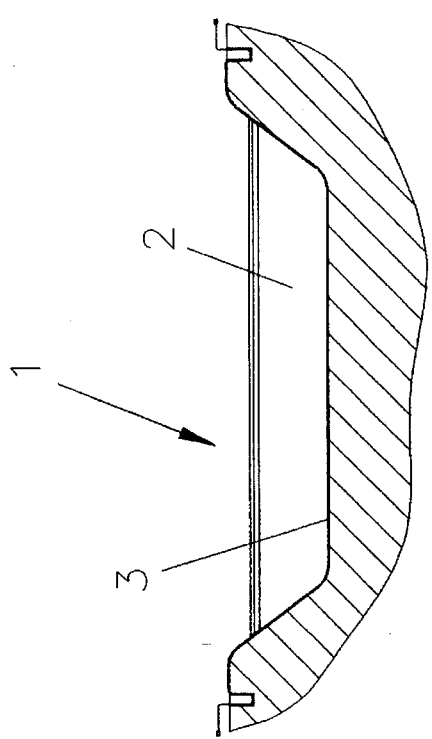

GEOMEMBRANE BARRIERS USING INTEGRAL FIBER OPTICS TO MONITOR BARRIER INTEGRITY

This invention was made with Government support under Contract No. DE-AC04-94AL85000 awarded by the U.S. Department of Energy. The Government has certain rights in this invention.

FIELD OF THE INVENTION

This invention relates generally to a method and an apparatus for integrating sensors and sensing methods into a barrier. More particularly, the invention relates to a method and an apparatus for using a bulk or distributed array of selected optical fiber sensors within a geomembrane barrier material to monitor in situ barrier integrity by identifying various physical forces, fluids and chemicals in contact with the barrier. Typical applications for this invention would be a bottom liner, an overlying cap or a side wall curtain surrounding a containment site or other hazardous or non-hazardous material storage or impoundment site. Typical information obtained from the sensors would include slope creep forces, liquid levels, puncture or breach size and location, the proximity of a fire, subsidence beneath the barrier, type of material in contact with a liner, etc.

BACKGROUND OF THE INVENTION

Associated with any containment site is the risk of the-contained material (hazardous or non-hazardous) leaking through the barrier, migrating into the surrounding area and possibly contaminating the underlying soil and ground water. Examples of containment sites requiring liquid proof barriers are brine ponds, hazardous material sites, oil storage sites, oil refining sites, and sanitary landfills, or other similar type sites. As environmental regulation becomes more stringent, the old methods of using multiple zones of clay in cellular geometries to establish liquid proof barriers under, around or above containment or other hazardous material sites are being replaced by new methods incorporating polymeric membranes as a means of encapsulation.

One example of a liquid proof barrier is a geomembrane, generally a polymeric material manufactured in long rolls approximately 20 feet in width. Another type of manufactured barrier makes use of a thin bentonite clay layer encapsulated between two layers of a special textile material. Geomembranes and other similar barriers are used both as liquid proof barriers during operation and as part of a cover structure over the containment site at the time of closure. Geomembranes or other similar barriers that have been incorporated into cover structures are required to contain and control biogases emanating from decomposing materials at the site as well as to prevent precipitation and surface water from entering and percolating down through the closed containment site. Hereafter geomembranes will be referred to as membranes and will refer to a resilient flexible material that forms a liquid proof barrier or a containing means for restraining the contents of the containment site. In addition to being flexible it is crucial that membranes be resistant to deterioration as a result of contact with the containment contents or byproducts of the containment contents.

The standard procedure for installing membranes and forming a barrier within the containment site is to lay sheets of the membrane material parallel to one another over the prepared base of the site. The membrane sheets are then fused along their edges, typically with a small crawler welder operating longitudinally at the overlap of the two adjacent membrane sheets-creating double weld zones with a tubular zone between the welds. There is extensive real time visual inspection of these fusion welds and also pressure testing of the tubular zone to see if the welds are leaking. If suspect areas are identified, they are repaired immediately. In addition, the EPA regulations require random sample testing of the weld quality at designated locations along the weld. This testing then requires that a patch be placed and sealed over the test sample hole. Sand, clay and gravel or any combination there of are typically placed over the membrane prior to the introduction of containment site material. Likewise the membrane material is thoroughly inspected at the time of manufacture, as well as, installation for any defects. In most membrane installations, heavy machinery is used to position the membrane and cover the membrane with soil. Membranes used as part of a cover structure are typically installed in a similar fashion, except placed over the containment site, and as such have similar problems to those described above.

Because of the processes used to install membranes within a containment site, even with the weld sampling and testing of the bulk membrane material the integrity of the barrier is largely unknown after installation. As environmental regulations become more stringent, it is critical that there be a reliable and cost effective method for monitoring the long term integrity of the barrier after installation and during the life of the containment site.

Whether the geomembrane is used as a barrier under the site, over the site, or around the site, there is a growing need to be able to ascertain the integrity of the geomembrane or the barrier as well as identify what if any fluids or gases have breached the barrier. There also is a need, but very limited technology currently available, to monitor the long term integrity of a barrier.

A variety of indirect techniques exist for determining membrane integrity. One approach is to use borehole sampling around the site to determine if any contamination plumes exist. The disadvantages are: 1) by the time a plume can be detected a leak would have to be substantial and contamination of soil and ground water would have already occurred and 2) periodic borehole sampling and analysis can be very costly. Another approach is to use electric current in conjunction with a conductive medium under a membrane. U.S. Pat. No. 4,740,757 describes a method by which electrodes are strategically placed under the membrane and electrically coupled through a conductive medium selectively placed between two membranes. U.S. Pat. No. 4,947,470 describes another method in which leaks are detected by placing wires and sensors in a grid pattern in a conductive medium under the membrane. In either of the methods described by U.S. Pat. No. 4,740,757 or U.S. Pat. No. 4,947,470, the disadvantages are similar in that the conductive medium is a mixture of moisture selectively placed under the membrane and the leaking substance. The combination of the conductive medium and a leaking substance can result in a larger contamination plume if the membrane is actually breached. Because of the need for a conductive liquid to be present and the natural presence of condensate caused by soil moisture, there is always a possibility for corrosion of the detectors or wires, impeding the ability to monitor and detect breeches on the barrier or membrane. Additionally, neither of the methods described by the US Patents can qualitatively or quantitatively identify the leaking material.

SUMMARY OF THE INVENTION

It is an object of this invention to provide an apparatus for monitoring and evaluating the long term integrity of a barrier beneath, above, or around a site containing either a hazardous or non-hazardous material.

It is an object of this invention to provide an apparatus for monitoring and evaluating physical properties of a membrane liner beneath, above or around a hazardous containment site or non-hazardous containment site.

It is an object of this invention to provide an apparatus for monitoring and evaluating physical properties of a membrane liner beneath, above or around a containment site and further identifying the leaking medium.

Further it is an object of this invention to provide a method for monitoring and evaluating a membrane that resides either beneath, above, or around a containment site and quantitatively determining the leaking medium.

Further it is an object of this invention to provide a method for detecting other physical changes such as stress levels, temperature changes, pressure levels, etc. occurring in the membrane that could be indicators of potential problems at the site.

Additional objects, advantages, and novel features of the invention will become apparent to those skilled in the art upon examination of the following description or may be learned by practice of the invention. The objects and advantages of the invention may be realized and attained by means of the instrumentalities and combinations particularly pointed out in the appended claims.

To achieve the foregoing and other objects, and in accordance with the purpose of the present invention, as embodied and broadly described herein, the present invention may comprise a barrier for restraining contents within a containment site, comprising a geomembrane having a first surface for facing the contents of the containment site and an opposed second surface, the geomembrane extending in a longitudinal direction; and a fiber optic strand for transmitting an optical signal, the fiber optic strand having a first end and a second end and being integral with the geomembrane.

BRIEF DESCRIPTION OF THE DRAWINGS

The accompanying drawings, which are incorporated in and form part of the specification, illustrate an embodiment Of the present invention, and together with the description, serve to explain the principles of the invention.

FIGS. 1A, 1B, and 1C show barrier configurations in a containment site.

DETAILED DESCRIPTION OF THE INVENTION

A typical containment site (1) as seen in FIGS. 1A–1C, is any site where a material (2) is stored and where it is necessary to prevent any leakage of the material to the atmosphere or underlying soils or Water zones. The material (2) within the containment site (1) can be either hazardous, similar to trash, oil or sewage, or non-hazardous, like water. In either case the containment site (1) is normally lined with a liquid proof barrier (3) or containing means either beneath (FIG. 1A), around (FIG. 1B), or above (FIG. 1C) or some combination thereof. This barrier is frequently a geomembrane.

Figure 2:
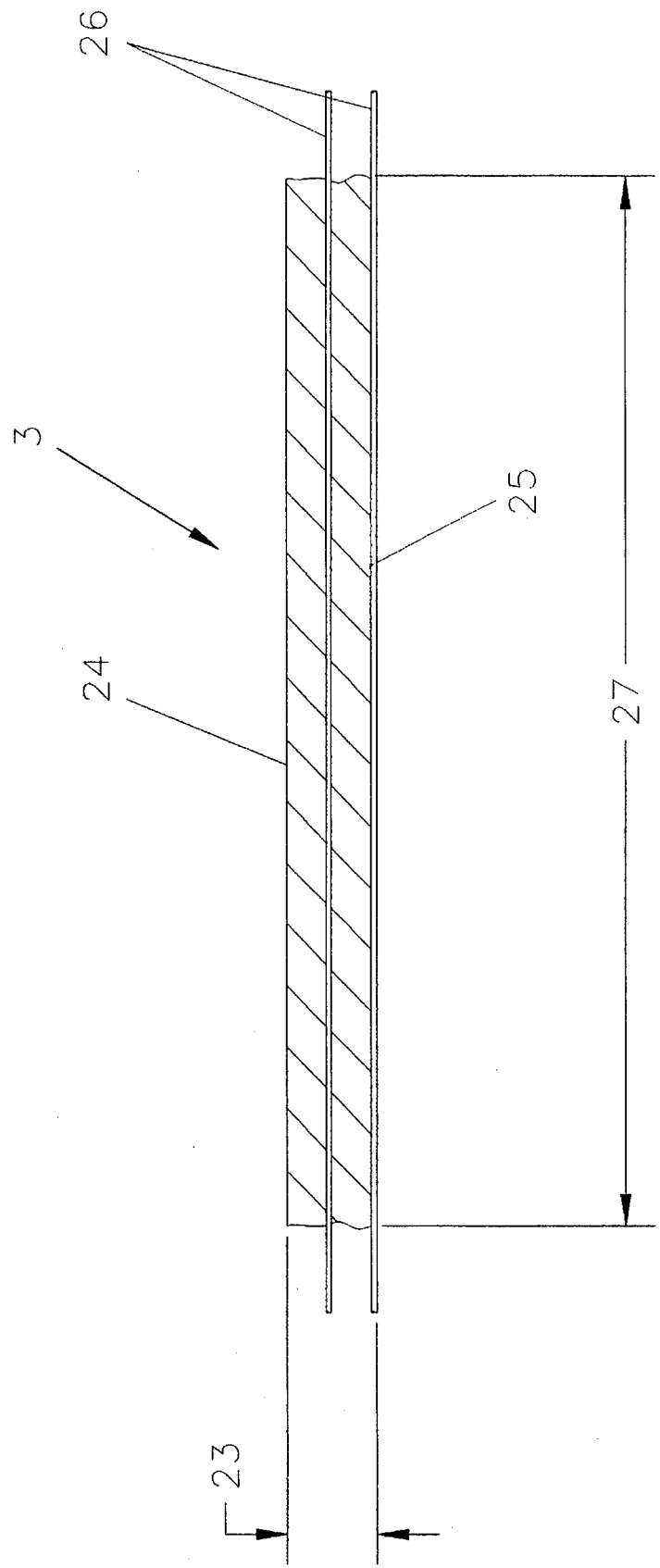
FIG. 2 is a cross section of a smart barrier.

A geomembrane (3) as seen in FIG. 2, can be made by a variety of processes. Two of the most common ways of making a membrane are the extrusion and blown film methods. Whereas membranes manufactured by extrusion or blown film processes are typically only a single layer or sheet thick, lamination of membrane sheets made by either process can be used to form a composite membrane. For example, a composite membrane manufactured by the lamination process would contain two or more membrane sheets heat sealed together. In either case the laminated membrane or the extruded membrane as seen in FIG. 2, has a first surface (24) which faces the material being contained, an opposing second surface (25), and thickness (23). The typical dimensions of a single strip of membrane used at a landfill are 600 ft. (length)×20 ft. (width)×0.060 in. (thickness). Several of these strips are unrolled side-by-side and heat fused at the longitudinal edges to form the containment site barrier.

The invention as described herein includes a smart barrier for detecting, locating and identifying a leak in a membrane or barrier. The smart barrier is a combination of at least one membrane layer or other membrane-like material having at least one light transmission means embedded within or between membrane layers, and a monitoring system capable of data acquisition and interpretation of the optical signal. The light transmission means is preferably a fiber optic strand, where the fiber optic strand can be modified to gather a variety of information. The fiber optic strand must be compatible and have a tensile strength equal to or greater than that of the membrane. The strength of the fiber optic strand is critical to assure that a breech of a membrane occurs at or before failure of the fiber optic strand to assure that the membrane integrity is accurately monitored.

Smart barriers take advantage of the inherent properties of fiber optic strands; e.g., changes in signal reflectance, deliberately created flaws, zones of stress, etc. measured by Optical Time Delay Response or other methods, to characterize and measure leak location and the leaking substance without concern for corrosion to the chemically inert fiber optic strand. Fiber optic strands can be designed to be sensitive to changes in their environment (pressure, surrounding medium, temperature etc.) causing the input signal and the reflectance signal to be different. The fact that fiber optic strands will not corrode enables the smart barrier to have a longer service life and to have the capability of being used in a wider variety of applications in harsher environments than standard barriers with underlying wire grids.

Fiber optic strands, unlike metal conductors, do not provide a conductive path for any source of electricity, into the contained medium. The advantage is a lesser site risk of a fire or explosion and increased reliability with fewer false signals.

Figure 3:
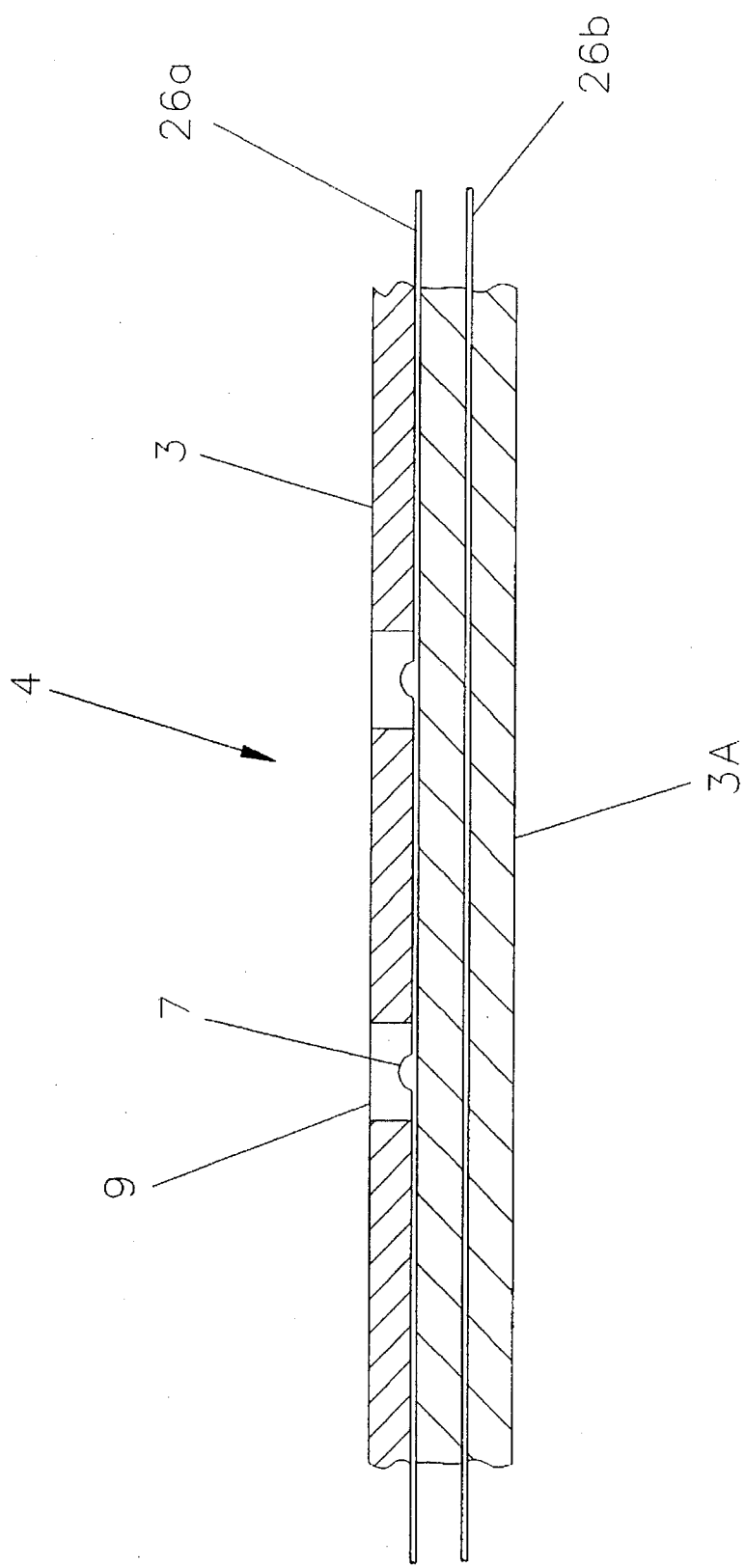
FIG. 3 is a cross section of a composite smart barrier.

The smart barrier, as seen in FIG. 2, may be manufactured by either lamination or extrusion, where the light transmission means (26) is integral with the membrane material. The light transmission means can be disposed within and generally parallel to and between the first surface (24) and the second surface (25) of the membrane or integral with either of the membrane surfaces. In either case, the light transmission means extends in the membranes longitudinal direction (27). It may also be formed as a composite membrane (4) as shown in FIG. 3. Any other material known to one of ordinary skill in the art, having similar characteristics and properties to a fiber optic strand can be directly incorporated in place of the fiber optic strand in the subject invention.

In the case of a composite membrane, as seen in FIG. 3, the fiber optic strands (26a) can reside in the laminated region between the bottom of membrane layer (3) and the top of membrane layer (3A), as well as being integral with the membranes (3 or 3A), depending on the system requirements. In either case the fiber optic strand(s) run in the longitudinal direction of the membrane.

One embodiment of the smart barrier, a composite smart barrier, is shown in FIG. 3. In this embodiment the composite smart barrier consisting of two membrane sheets (3) and (3A). The membrane sheet (3A) is the primary membrane and has the structure as shown in FIG. 2 including an embedded fiber optic strand (26b). The top or secondary membrane sheet (3) can have an embedded fiber optic strand as shown in FIG. 2 or, as shown in FIG. 3, a fiber optic strand (26a) embedded between layers (3) and (3A). Additionally the secondary membrane may have engineered openings (9) to provide fluid access to an underlying sensor (7). As shown in FIG. 3, fiber optic strand (26a) has a plurality of sensors (7) integral therein. In this embodiment, the fiber optic strands are used to detect membrane breech, creep or other barrier characteristics. The fiber optic strand (26a) with integral sensor (7) can be used to identify the type of material in contact with the membrane. This embodiment can be composed of a plurality of membrane sheets, and/or fiber optic strands, as required by the system.

Figure 4:
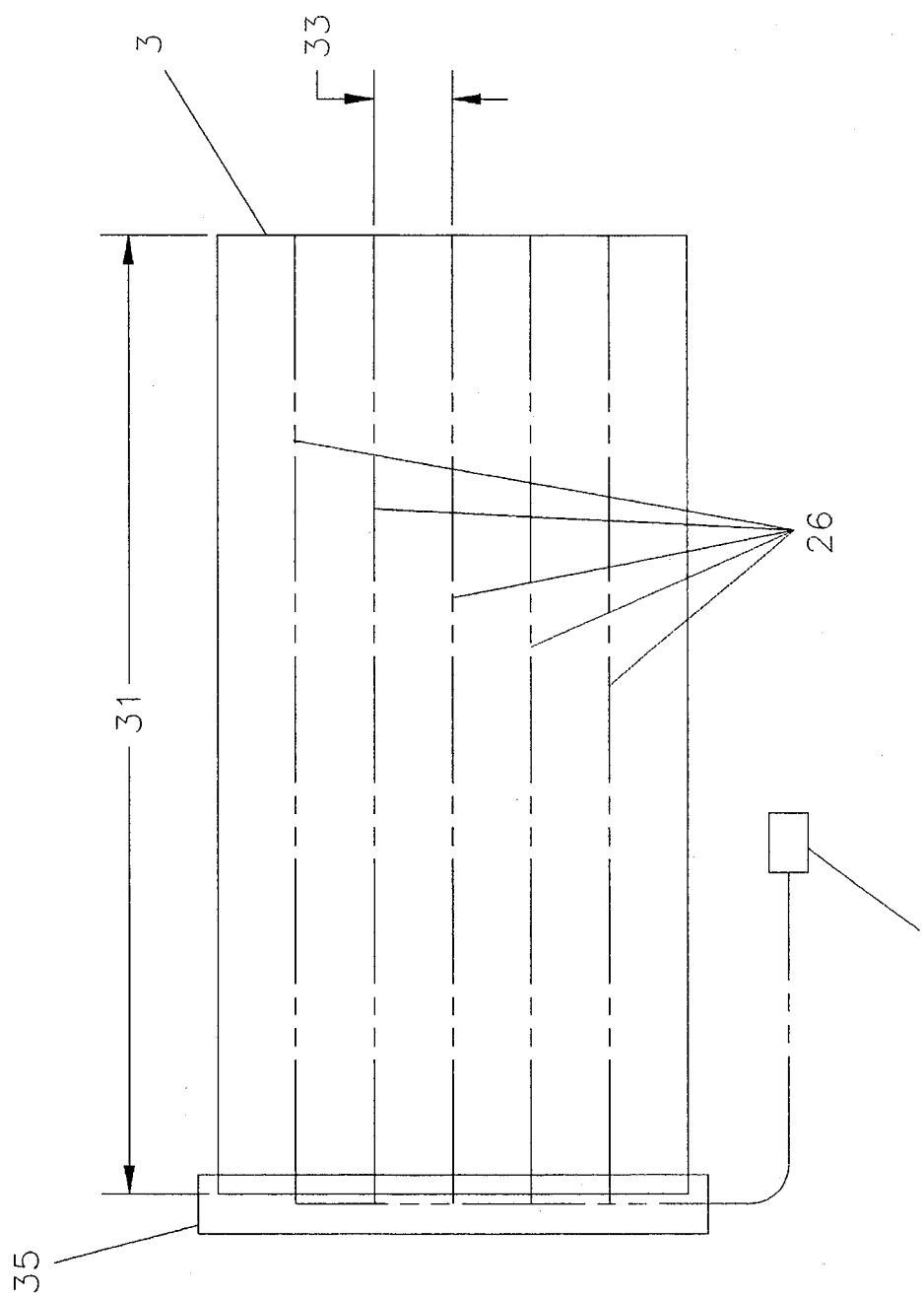
FIG. 4 is a planar view of a smart barrier.

FIG. 4 shows a planar view of a smart barrier. The fiber optic strands (26) extend in the longitudinal direction along the length (31) of the membrane in a continuous fashion. The spacing (33) and the number of fiber optic strands (26) is determined by the required leak detection sensitivity. The larger the distance between the fiber optic strands (33) the smaller the resolution for leak detection and vice versa, the smaller the distance between the fiber optic strands the greater the resolution. The fiber optic strands (26) run the length of the membrane and are exposed at the ends of each strip, where they are typically coupled to an optical interface (35) either on one or both of the exposed ends. The optical interface (35) may be any known technology but must be able to couple the light signal to an electrical interface in a control system (37). The control system can either be a remotely placed computer system or a portable computer system that can be connected and used to initiate and monitor the optical signal and complete the analysis where needed.

Additionally, by physically changing the exterior of the fiber optic strands (26), the fiber optic strands can be used in a sensor mode. U.S. Pat. Nos. 5,132,529 and U.S. Pat. No. 5,072,617 both disclose technology to manufacture fiber optic sensors by modifying fiber optic strands. These methods incorporate deliberate changes to the strands or removal of outer coatings. Similar methods can be used to create fiber optic sensors that are then embedded in a membrane and used for membrane creep detection by measuring optical signal changes in the sensor caused by stress in the membrane. One method of forming a strain gage in a membrane is by deforming the fiber optic strands prior to insertion in the smart barrier, then as the barrier moves in the containment site, the reflected signal is changed and the measured stress can be converted to related creep levels. The same sensor could also be used for detection of landfill fires by measuring the output signal rate of change for comparison of a long term event such as creep and a short term event such as a fire. In general the optical interface (35) communicates with a control system (37) or monitoring means, wherein the monitoring means is typically a computer control system capable of continuous or periodic monitoring of the smart barrier condition. Additionally, the control system must be capable of qualitatively or quantitatively determining leak location, leak size, the substance in contact with the membrane or barrier.

The method and apparatus for detecting and identifying a leak through or a substance in contact with a membrane or barrier beneath, above or around a containment site or other hazardous or non-hazardous material site are cited merely to illustrate particular embodiments of this invention. It is contemplated that the use of this invention may involve a variety of structures having different sizes, shapes, and materials as long as the principles of the system disclosed herein are followed. For example, although the invention has been disclosed focusing on a method and apparatus for detecting leaks in membranes, typically under a hazardous material site, the membrane could be placed in any geometry at a site requiring monitoring. Likewise, any combination of membrane like material and a light path known to one of ordinary skill in the art can be used to implement the method as long the minimum system requirements as described are adhered to achieve similar results. It is intended that the scope of the invention be defined by the claims appended below.

What is claimed is:

1. A barrier for a containment site, comprising:

containing means for restraining contents within a containment site, said containing means having a first surface for facing the contents of the containment site and an opposed second surface, said containing means comprising a geomembrane extending in a longitudinal direction; and light transmission means for transmitting an optical signal, said light transmission means having a first end and a second end and being integral with said geomembrane, said light transmission means comprising a fiber optic strand having a tensile strength greater than or equal to the tensile strength of said geomembrane;

wherein a change in a received optical signal transmitted through said fiber optic strand is indicative of a change in said geomembrane.

2. A barrier as claimed in claim 1, wherein said transmission means is generally parallel to and between said first and second surfaces of said containing means in the longitudinal direction, said first end and said second end of said transmission means extending outward from said containing means.

3. A barrier as claimed in claim 2, wherein the first end of said transmission means is connected to an optical interface.

4. A barrier as claimed in claim 3, wherein a control system is connected to said optical interface, said control system generating an optical input signal, receiving a reflected optical output signal from said light transmission means, and analyzing the reflected signal to determine the status of said smart barrier.

5. A barrier as claimed in claim 2, wherein the second end of the light transmission means is connected to an optical interface.

6. A barrier as claimed in claim 1, wherein said transmission means is embedded within said containing means.

7. A barrier as claimed in claim 1, wherein the light transmission means is a plurality of fiber optic strands and each of said fiber optic strands runs generally parallel to each other and in the longitudinal direction of said containing means.

8. A barrier as claimed in claim 7, wherein said fiber optic strands transmit an input signal and a reflected output signal.

9. A barrier as claimed in claim 8, wherein the first end and the second end of each of said fiber optic strands extends in an outwardly direction from said containing means.

10. A barrier as claimed in claim 9, wherein each of said fiber optic strands run integral with the second surface of said containing means.

11. A barrier as claimed in claim 8, wherein the first end of each of said fiber optic strands is connected to an optical interface.

12. A barrier as claimed in claim 8, wherein the barrier is a composite barrier.

13. A barrier as claimed in claim 12, wherein the composite barrier includes a primary containing means and a secondary containing means, each having a first and a second surface, wherein a first surface of said secondary containing means is adjacent the contents of said containment site and a first surface of said primary containing means is in contact with an opposing second surface of said secondary containing means at an interface.

14. A barrier as claimed in claim 13, wherein the primary containing means includes at least one integral fiber optic strand extending in the longitudinal direction.

15. A barrier as claimed in claim 14, wherein said integral fiber optic strand is between the first and second surfaces of said primary containing means.

16. A barrier as claimed in claim 13, wherein the interface further includes at least one fiber optic strand.

17. A barrier as claimed in claim 14, wherein said secondary containing means further includes at least one fiber optic strand and said fiber optic strand is integrally within said secondary containing means.

18. A barrier as claimed in claim 17, wherein said fiber optic strand in said secondary containing means further includes an integral sensing means for detecting changing environmental conditions surrounding the fiber optic strands.

19. A barrier as claimed in claim 18, wherein said secondary containing means further includes engineered openings extending from the first surface to said sensing means.

20. A barrier as claimed in claim 13 wherein said primary and secondary containing means are a material chosen from the group consisting of: a geomembrane and geotextile.

* * * * *